United States Patent [19]

Cohen et al.

[11] Patent Number: 4,575,767

[45] Date of Patent: Mar. 11, 1986

[54] LOW-MOIRE DIRECTIONAL OPTICAL FILTER FOR CRT DISPLAYS

[75] Inventors: Richard L. Cohen, Matawan; John C. Wilson, Jr., Wayne; Mitchell Aron, Harrington Park, all of N.J.

[73] Assignee: Allied Corporation, Morris County, Morris Township, N.J.

[21] Appl. No.: 569,363

[22] Filed: Jan. 9, 1984

[51] Int. Cl.[4] .......... H04N 5/72

[52] U.S. Cl. .......... 358/250; 358/252

[58] Field of Search .......... 358/250, 251, 252, 253; 350/162

[56] References Cited

U.S. PATENT DOCUMENTS 3,194,885 7/1968 Hamilton .......... 358/252

*Primary Examiner*—Edward L. Coles, Sr.

*Attorney, Agent, or Firm*—Stanley N. Protigal; Howard G. Massung

[57] ABSTRACT

A directional optical filter (41) is provided for a shadow mask color cathode ray tube (shadow mask CRT) (47) having a plurality of display elements on its face (49). Two sets of light absorbing planes are arranged at approximately 90° from one another and serve to block light passing therethrough from an angle greater than a predetermined angle of viewing. In order to reduce moire patterns which would result from varying coincidences of the planes with patterns of phosphor dots on the shadow mask CRT (47), filter sheets (43, 45) containing the light absorbing planes are rotated so that at least one set of light absorbing planes is misaligned with a set of closely-adjacent phosphor dots by approximately 15°. Advantages include the ability to provide a parallel light absorbing plane directional optical filter in association with a shadow mask CRT and an ability to control the range of preferred viewing angles to differing amounts substantially in the horizontal and vertical directions.

16 Claims, 2 Drawing Figures

LOW-MOIRE DIRECTIONAL OPTICAL FILTER FOR CRT DISPLAYS

BACKGROUND OF THE INVENTION

This invention relates to radiant energy filtration and more specifically to a directional filter which attenuates radiant energy such as light entering the filter from outside of a pre-determined angle of incidence. In particular, the invention is useful for heads down displays in aircraft cockpits which use shadow mask color cathode ray tubes (shadow mask CRTs), although it may also find utility in a number of other aplications using video displays under adverse lighting conditions.

Heads down displays of the type described are used to display a wide variety of aircraft navigational information in the cockpit of the craft. Often, different information is superimposed or is presented in detail which is difficult to read under varying ambient light conditions. When ambient light is low, as in night flying, it is a relatively simple task to reduce the brightness of the aircraft display. On the other hand, there are frequently ambient light conditions which require a display brightness that would be impractical either as a result of the capabilities of the display or the safety or comfort of the viewer. For example, if sunlight is creating a high glare condition, the display would not only have to overcome the glare but be bright enough for the information provided by the display to be discernible over background lighting conditions. Additionally, during the aircraft's maneuvering, lighting conditions can be expected to change rapidly. While an optical sensor can be used to sense ambient light intensity conditions, glare conditions can not always be determined by merely measuring ambient light levels.

The fixed position of the pilot-viewer enables the use of filter techniques which direct light in a single direction. For this reason, directional filters of various types have been placed in front of the CRT displays in order to block light from external sources which would tend to cause glare, while passing that light from the CRT which is traveling in the direction of the viewer. While there is a certain amount of optical amplitude (brightness) loss inherent in the use of any filter, the loss of brightness is compensated for by the decrease in glare conditions.

Prior art light filtration techniques include the use of neutral density filters. Such filters attenuate external source light as well as light from the display; however, external source light necessarily passes the filter twice and, therefore, is blocked by a square of the attenuation of light from the display itself. In the case of monocromatic displays, a notch filter is sometimes used to select the specific colors of light which are generated by or used in connection with the display. Ambient light would be highly filtered because only a small percentage of the ambient light would fall within the range of the notch filter. With the use of color display techniques, the use of a notch filter is less practical since several different wave lengths must be within the admittance bands of the notch filter.

Directional filters are used to transmit light only in a desired direction. If it is anticipated that ambient light which would cause glare would emanate from a direction other than that of the anticipated direction of the viewer from the display, it is possible to filter such ambient light using directional filters. In one type of prior art directional filter, a sheet of material is etched in order to form a large number of holes. The surfaces of the material at the holes have a high absorbency in order to eliminate reflection along the holes and at the surface of the sheet. Frequently, the sheets are stacked in order to enhance the attenuation effect of the filter. This technique is frequently expensive and may have light attenuation characteristics which are excessive.

Another directional filtration technique involves the construction of a filter plate from a plurality of sheets of thin material. The thin sheets are stacked so that each sheet is parallel to an admittance direction of light. The filter plate is taken from the stack of sheets by cutting a slice across the stack. This results in the filter plate being generally orthogonal to the direction of the individual thin sheets from which it is made, with the slice direction varying from the orthogonal direction for central viewing angles which vary from normal to the surface of the filter. This product is available from 3M Company, St. Paul, Minn., Display Products Division, and is sold under the trade name, "3M Brand Display Film."

In the prior art, direction sensitive contrast enhancement filters were unusable with shadow mask type color cathode ray tubes due to moire interference patterns which were created. These patterns are created because the amount of light that is transmitted by each phosphor dot depends upon the open area of the holes in the filter that expose each phosphor dot. This open area will in general be different for each phosphor dot. Since both the phosphor dots and filter holes are each ordered arrays, a moire modulation pattern is created which interferes with the desired picture and/or data. It has been generally accepted by the industry that direction sensitive contrast enhancement filters are not useable with shadow mask tubes because of the high costs encountered in overcoming this moire interference. It is this problem in the prior art that the subject invention solves.

It is an object of this invention to provide a direction sensitive contrast enhancement filter for a specific color cathode ray tube having dots of color phosphor of any size and shape and in any ordered arrangement by selecting filter hole size and spacing to minimize moire interference patterns to unnoticeable or unobjectionable levels. It is desired that such a filter have minimal attenuation of light in a desired viewing direction and have a maximum attenuation of light passing from beyond a given angle. It is further desired that the filter be useable with full color displays, as well as for the viewing of external conditions, as in the case of heads-up displays. It is further desired that the filter maintain a high effectiveness in adverse ambient lighting conditions with a minimum of attenuation of displayed lighting under those adverse conditions. The desired filter would be useful for direct view displays having passive and active illumination characteristics, as well as heads-up displays (HUD'S) and wind screens used for external viewing by humans and electronic sensors.

SUMMARY OF THE INVENTION

In accordance with the present invention, a directional filter using filter media having a parallel line light-blocking pattern is used in association with a matrix dot video display apparatus such as a color cathode ray tube (CRT). In order to eliminate moire patterns which would ordinarily occur from the superimposition of a parallel pattern filter on a regularly patterned display, the filter media are aligned at a predetermined angle to be horizontal and vertical directions of the display. In one embodiment, filter media consisting of transparent laminations is used in association with the shadow mask color cathode ray tube assembly. The laminations are aligned at an angle of approximately 15° from a direction of alignment of successive image dots on the cathode ray tube. A second sheet is aligned so that the grooves are approximately at a 90° angle from the alignment of the first groove, thereby, positioning the alignment of the second set of grooves at approximately 75° or 105° from the alignment of the dots.

DETAILED DESCRIPTION OF THE PREFERRED EMBODIMENTS

Figure 1:
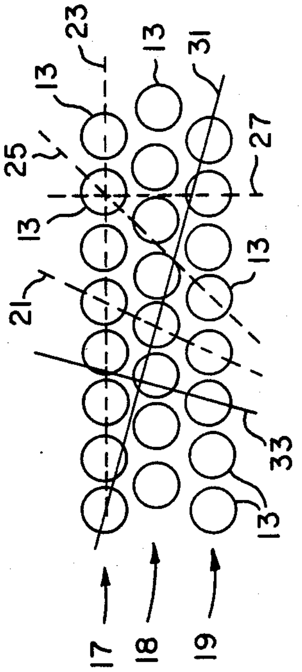
FIG. 1 is a diagram representing a portion of a shadow mask cathode ray tube (CRT), showing directional alignments with respect to phosphor dots on the CRT.

FIG. 1 is an enlarged diagram of a viewing screen of a shadow mask color cathode ray tube (shadow mask CRT). On the face of the shadow mask CRT are a plurality of display elements. Typically the display elements are phosphor dots 13, defined by the CRT's shadow mask and phosphor coating. The shadow mask and phosphor coating are internal components of the shadow mask CRT and are not separately shown. The phosphor dots 13 are typically arranged in a plurality of horizontal rows 17, 18, 19 and in a pattern in which similar groups of phosphor dots 13 appear across the face of the CRT in a regular pattern. In the arrangement shown in FIG. 1, the phosphor dots are each equally spaced from one another, thus establishing a pattern. While the phosphor dots 13, will be described, the present invention may be used with different types of display elements such as rectangles (not shown).

Typically the pattern of phosphor dots 13 include groups of three dots equidistantly spaced, so that the centers of the dots 13 within the groups occur at the apexes of equilateral triangles. Each of the three will display a different primary light color, such as red, green and blue. Dots 13 having the same color can be said to have similar features. Dots 13 having similar features form a regular pattern on the shadow mask CRT. When the dots 13 are equally spaced, and the dots 13 are arranged in horizontal rows 17, 18, 19, the relationship between dots 13 in any one row, such as row 17, is such that a line 21 occurs at an angle of 60° from a line 23 drawn horizontally between phosphor dots 13. Likewise, dots 13 displaying the same color would be similarly aligned. A line, such as line 25, drawn 45° from the horizontal, and passing through a phosphor dot 13 in one row 17, would intersect a phosphor dot 13 in the next row 19, in which the phosphor dots 13 are vertically aligned. The same would be true for a vertical line such as line 27. In a similar fashion, any line parallel to a line passing through a particular group of phosphor dots 13 would necessarily intersect the same portion of each of those dots. It can be seen that, if light from the phosphor dots 13 is blocked along the line parallel to any of lines 21–27, then a regular pattern of light blockage would be set up along that line.

Moire interference is caused by slight differences in light blockage along the length of two almost parallel arrays or two arrays having slightly different frequencies. This applies to lines which are superimposed over the phosphor dots 13 unless the lines are almost perfectly aligned with the dots 13. In practice, it is difficult to achieve such an almost-perfect alignment. In the case of light blockage along a plurality of parallel lines, the pattern of light blockage would create a moire pattern across the face of the CRT, making viewing of the CRT difficult. If, on the other hand, it is possible to block light along a path in which adjacent or closely adjacent phosphor dots 13 are not similarly affected, then a regular pattern of phosphor dots 13 darkened by like amounts would not likely occur.

In FIG. 1, line 31 is arranged at an angle of 15° from the horizontal (15° from line 23). Line 33 is arranged at a 90° angle from line 31 and, consequently, occurs at an angle of 75° from the horizontal (75° from line 23).

Figure 2:
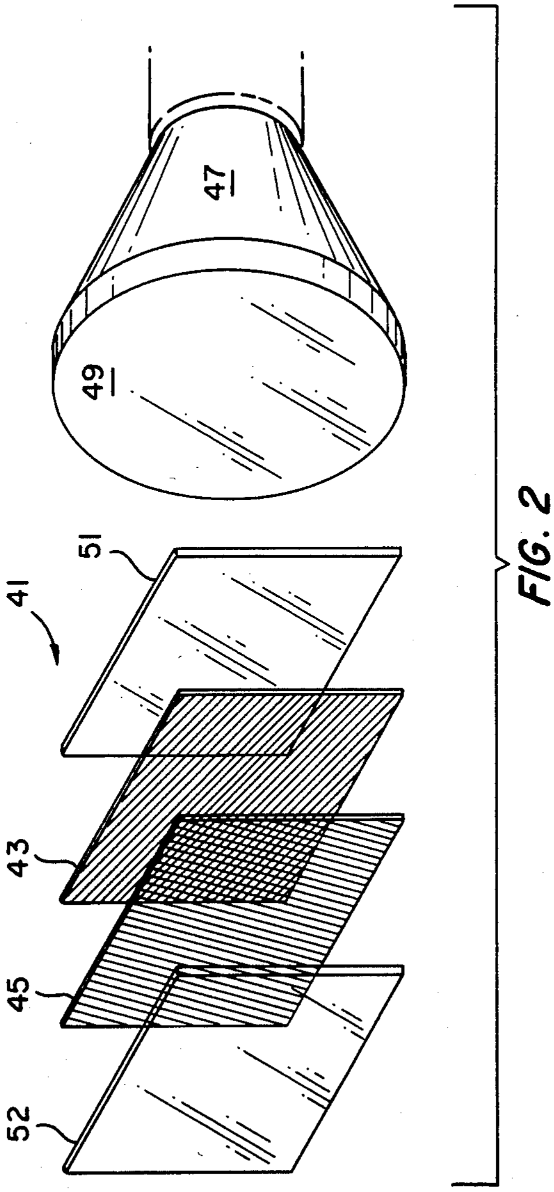
FIG. 2 is an assembly drawing of a directional filter constructed in accordance with the present invention.

Referring the FIG. 2, in a preferred embodiment of the invention, a directional optical filter 41 is constructed from one or more transparent filter sheets 43, 45 having a plurality of light absorbing planes therein which block light passing through the sheets 43, 45 beyond a certain angle with respect to the planes. Typically, these planes are formed as boundary lines between laminations which make up the transparent filter sheets 43, 45. In other cases, the planes could be light-absorbing grooves or opaque planes formed within the transparent filter sheets 43, 45. Such opaque planes can be created, for example, by providing a material within the filter sheet 43, 45 which is photoactive and developing this photoactive material by exposing the photoactive material to laser light. In the preferred embodiment, a pair of transparent filter sheets 43, 45 are formed as slices of a laminated stack of transparent layers in which the boundaries between the successive laminations have light absorbing properties. These laminations form the light absorbing planes.

In order to reduce glare and other effects of ambient light on the viewing of a shadow mask CRT 47, the pair of transparent filter sheets 43, 45 shown are placed in front of the CRT 47 adjacent to a viewing face 49 of the CRT. When viewing the CRT 47, the light absorbing planes appear as opaque stripes on the filter sheets 43, 45. The transparent filter sheets 43, 45 are preferrably aligned so that they are light absorbing planes are perpendicular to one another; that is, that they occur along lines which are 90° angles to one another. It is also possible to vary the angle between the light absorbing planes on the different sheets 43, 45. Such a nonorthogonal relationship may be necessary where the dot pattern on the CRT 47 does not conform to the 90° angle. In order to avoid the formation of moire patterns on an image appearing on the face of 49 of the CRT 47, the transparent filter sheets 43, 45 are positioned against the face 49 so that the light absorbing planes are at an angle which is significantly displaced from any angle formed by any pattern of the phosphor dots 13.

The light absorbing planes are ordinarily aligned at a 90° angle from the surface of their filter sheets 43, 45, thereby presenting a preferred viewing angle of 0° from normal to the face 49 of the CRT 47. It is possible to align the light absorbing planes at an angle of less than 90° from the surface of one or both of the filter sheets 43, 45 to allow for preferred viewing angles of other than normal to the face.

Referring to FIG. 1, the light absorbing planes would be arranged parallel to the solid lines 31, 33 so that one set of planes is approximately 15° from a line such as lines 21 or 23, drawn through a set of adjacent phosphor dots 13. When the phosphor dots 13 are arranged as shown in FIG. 1, this 15° angle occurs between solid line 31 and dashed line 23 and between solid line 33 and dashed line 21.

Referring to FIG. 2, in order to provide structural rigidity to the transparent filter sheets 43, 45, they are sandwiched between a pair of additional transparent sheets 51, 52. The transparent filter sheets 43, 45 and the additional transparent sheets 51, 52 are bonded together by layers of room temperature vulcanizing (RTV) rubber. The resulting directional optical filter 41 is then placed immediately adjacent the CRT's face 49 as a face mask with the stripes having an alignment such as lines 31 and 33 shown in FIG. 1.

In the preferred embodiment, the alignment of the planes in the transparent filter sheet 43, 45 is 15°, with a positive or negative error of 3°. It is also possible to achieve closely-related results with filter sheets having double the error (within 6° of the 15° alignment) or even triple the error (within 9° of the 15° alignment). It may be found that a slight amount of error, such as 3° may actually enhance the moire rejecting the characteristics of the filter 41 by further avoiding equal blockages of patterns of phosphor dots 13.

In order to further enhance the performance of the filter 41, an anti-reflective coating 55 is placed on the exterior surface of that transparent sheet 53, which is furthest from the face 49 of the CRT 47. A transparent conductor may be applied to the other transparent sheet 51 so that static build-up can be grounded.

As can be seen from the above description, it is possible to vary the specific configuration of the preferred embodiment while remaining within the scope of the invention. For example, it is possible to use a single transparent filter sheet instead of a pair of transparent filter sheets 43, 45 in which two sets of planes at approximately 90° from each other occur. It is also possible to eliminate the additional transparent sheets 51, 52 and to vary the specific method of assembling the optical filter, as by eliminating the RTV rubber.

What is claimed is:

1. Directional optical filter, for use with a display having a plurality of display elements which are in a regular pattern and which are selectively illuminated in order to provide display patterns, some of which elements have similar features, characterized in that:
   - (a) a plurality of planes, which are substantially light absorbing, are disposed substantially parallel to a preferred viewing angle with respect to the display;
   - (b) the light absorbing planes are disposed in at least one set, in which the planes in said set are substantially parallel to one another; and
   - (c) each set, when viewed from the preferred viewing angle, is positioned so that the substantially parallel planes are misaligned approximately 15° from lines passing through the most closely aligned elements having similar features.

2. Apparatus as described in claim 1, further characterized in that:
   - the light absorbing planes are contained within at least one light transmitting plate.

3. Apparatus as described in claim 2, further characterized in that:
   - each set of substantially parallel planes is contained within one plate.

4. Apparatus as described in claim 3, further characterized in that:
   - the light absorbing planes are formed as boundary layers between laminations of the planes.

5. Apparatus as described in claim 1, further characterized in that:
   - at least two sets of planes are provided and said two sets are disposed approximately orthogonally to each other.

6. Apparatus as described in claim 3, further characterized in that:
   - at least two sets of planes are provided and said two sets are disposed approximately orthogonally to each other.

7. Apparatus as described in claim 1, further characterized in that:
   - at least two sets of planes are provided, and said two sets are disposed at non-orthogonal angles to each other.

8. Apparatus as described in claim 3, further characterized in that:
   - at least two sets of planes are provided, and said two sets are disposed at non-orthogonal angles to each other.

9. Apparatus as described in claim 1, further characterized in that:
   - the misalignment of each set deviates from the 15° misalignment by a small amount.

10. Apparatus as described in claim 5, further characterized in that:
    - the misalignment of each set deviates from the 15° misalignment by a small amount.

11. Apparatus as described in claim 9, further characterized in that:
    - said small amount is approximately 3°.

12. Apparatus as described in claim 10, further characterized in that:
    - said small amount is approximately 3°.

13. Apparatus as described in claim 1, further characterized in that:
    - said misalignment may vary by up to 6+.

14. Apparatus as described in claim 1, further characterized in that:
    - said misalignment may vary by 3°.

15. Directional optical fiter for use with a shadow mask cathode ray tube, having a display element pattern thereon, some of which elements have similar features, characterized in that:
    - (a) a plurality of planes, which are substantially light absorbing, are disposed substantially parallel to a preferred viewing angle with respect to the display;
    - (b) the light absorbing planes are disposed at least one set, in which the planes in said set are substantially parallel to one another; and
    - (c) each set, when viewed from the preferred viewing angle, is aligned so that the substantially parallel planes are misaligned approximately 15° from lines passing through the most closely aligned elements having similar features.

16. Apparatus as described in claim 15, further characterized in that:
    - at least two sets of planes are provided and said two sets are disposed approximately orthogonally to each other.

* * * * *